United States Patent Office.

JACOB H. SMYSER, OF PITTSBURG, PENNSYLVANIA.

Letters Patent No. 110,690, dated January 3, 1871.

IMPROVEMENT IN LUBRICATING COMPOUNDS.

The Schedule referred to in these Letters Patent and making part of the same.

*To all whom it may concern:*

Be it known that I, JACOB H. SMYSER, of Pittsburg, in the county of Alleghany and State of Pennsylvania, have invented a new and useful Improvement in Lubricating Compounds; and I do hereby declare the following to be a full, clear, and exact description of the same.

Letters Patent of the United States No. 101,325 were issued to me on the 29th March, 1870, for improvement in lubricating compound, which was made of vulcanized rubber and petroleum, that was distilled and mixed with the products of its distillation and with tallow or other grease or oil. This lubricator I found, and still find, to be valuable and useful for very many purposes, and so use it; but I also found, by practical experiment and use, that for many purposes the compound, as patented above to me, could be further reduced and mixed, and be more valuable, as it was more economical, for many uses.

I take the compound as prepared under my patent as aforesaid and mix with it pine-tar or coal-tar, in the proportions about as follows, viz:

To one hundred pounds of the lubricating compound above described as made of vulcanized rubber, petroleum, tallow, grease, or oil, I add about ten pounds of pine or coal-oil. This lubricating compound and the pine or coal-tar are melted together in a suitable vessel and strained while hot, and together form the compound which I desire to have patented to me.

I do not confine myself to the proportions herein mentioned, for they may be varied, both as to the original compound as well as of the coal or pine-tar. The proportions I have mentioned answer a good purpose, but the gravity and consistency of the compound may be varied to suit varied purposes by varying the quantities of the material and ingredients.

Having thus fully described my invention,

What I claim as new, and desire to secure by Letters Patent, is—

A lubricating compound, composed of vulcanized rubber, petroleum, tallow, oil, or other grease, mixed with pine or coal-tar, as and for the purpose herein described and represented.

JACOB H. SMYSER.

Witnesses:
    H. M. ROLFE,
    SAML. PRESTLEY.